April 14, 1925. 1,533,204
H. W. NEWBERG
GOVERNOR OPERATED VALVE MECHANISM
Filed Aug. 29, 1921
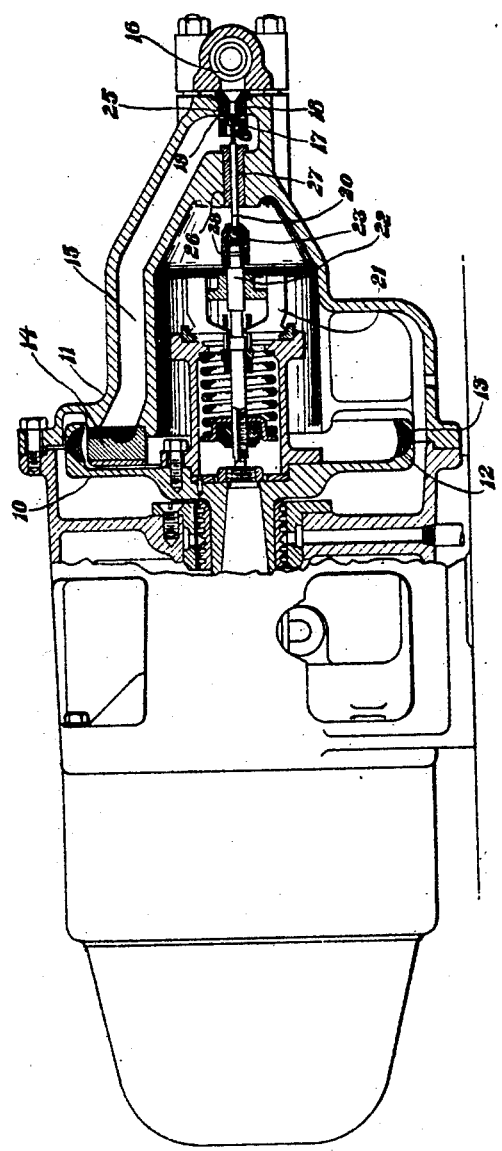
H. W. Newberg
INVENTOR
BY D. C. Davis
ATTORNEY Patented Apr. 14, 1925.

1,533,204

UNITED STATES PATENT OFFICE.

HUGH W. NEWBERG, OF CHESTER, PENNSYLVANIA, ASSIGNOR TO WESTINGHOUSE ELECTRIC AND MANUFACTURING COMPANY, A CORPORATION OF PENNSYLVANIA.

GOVERNOR-OPERATED VALVE MECHANISM.

Application filed August 29, 1921. Serial No. 496,569.

*To all whom it may concern:*

Be it known that I, HUGH W. NEWBERG, a citizen of the United States, and a resident of Chester, in the county of Delaware and State of Pennsylvania, have invented a new and useful Improvement in Governor-Operated Valve Mechanisms, of which the following is a specification.

My invention relates to a governor-operated valve mechanism for prime movers and it has for its object to provide apparatus of the character designated including a relatively simple and durable valve and an operating connection between the governor and the valve which shall not require precise alignment of parts to secure good operation.

Apparatus embodying features of my invention is illustrated on the accompanying drawing, forming a part of this application, in which the single figure shows a turbine in section with my improved governor-operated valve mechanism applied thereto.

In connection with prime movers, more particularly of the small, high-speed type, for example, locomotive headlight turbines, trouble has been experienced with the governor-controlled, motive-fluid admission valves due to the rapid wear thereof which takes place principally on account of cutting thereof by the motive fluid.

Accordingly, I have devised a motive-fluid admission valve for apparatus of the character designated which is more durable and therefore renders the apparatus more reliable in operation. My motive-fluid admission valve comprises a seat member and a ball member which is freely movable in all directions so as to present different surfaces for contact with the seat member; and, due to this movement of the ball member, the latter is not as likely to become steam cut as an admission valve of the old, or conical, type. A valve member of the ball type may be made of any desired hard material, for example, hard steel, cheaply and with a high degree of accuracy.

In accordance with my invention, the ball member of the valve is opened by the pressure of motive fluid and such ball member is moved toward its seat by governor mechanism when the prime mover exceeds a predetermined speed. I have devised a transmitting connection to transmit the movement of the governor to the ball member to move the latter toward its seat which shall properly operate even though the valve, the transmitting connection, and the governor may not be exactly in alignment. This latter result is effected by the provision of a ball contact connection between the governor spindle and the transmitting element; and, of course, the transmitting element merely contacts with the ball member of the valve.

Referring now more particularly to the drawing for a detailed description of my invention, I show an elastic-fluid turbine of any suitable type which comprises a rotor 10 and a cylinder or casing 11. For example, the rotor may have an overhanging flange 12 provided with an interior annular series of buckets 13 supplied with steam from a nozzle and a reversing chamber member 14, which, in turn, is supplied with steam from the passageway 15 provided in the cylinder or casing element.

Steam enters the passageway 15 from any suitable supply member 16 and the passage thereof into the passageway 15 is under the control of a suitable valve comprising a ball-valve member 17 and a ball-valve seat bushing 18. The ball-valve seat bushing is provided with a central bore which communicates, at one end, with the supply member 16, and, at the other end, with passageway 15, the bore being enlarged so as to constitute an appropriate seat for the ball-valve member. Ports 19 are provided in the ball-valve seat bushing adjacent to the seat portion in order to provide for the ready entrance of steam into the passageway 15. The ball-valve member is opened to allow the passage of steam to the passageway 15 due to the pressure of the steam and it is moved toward the seat by a suitable push rod 20 when the weights 21 of the governor fly out, thereby resulting in motion of the governor spindle 22 to the right which acts through the transmitting ball 23, carried by a socket 28 secured to the governor spindle 22, to transmit its motion to the push rod and to the ball valve member 17.

The casing or cylinder 11 is preferably provided with bores 25 and 26, communicating with the steam passageway 15, the bore 25 being adapted to receive the ball valve seat member or bushing 18 and the bore 26 being adapted to receive the member 27 which constitutes a steam-tight bushing for the push rod 20.

It will be obvious that, as the push rod 20 is not positively connected to the governor spindle 22 nor to the ball-valve member, the ball-valve seat member 18, the bushing 27, and the governor spindle need not be in alignment for the reason that the ball connection between the governor spindle and the push rod and the manner of contact of the push rod with the ball-valve member 17 will permit of lateral adjustment of the push rod with respect to these parts to take care of any incidental inaccuracies.

From the foregoing, the operation of apparatus made in accordance with my invention will be obvious. Steam is admitted to the passageway 15 by means of the ball valve whose ball-valve member 17 is under the control of the governor carried by the rotor. If the rotor should tend to exceed its normal speed, the weights 21 thereof will fly out resulting in movement of the governor spindle 22 to the right and the consequent movement of the ball-valve member 17 toward its seat to restrict the supply of steam to the passageway 15. If the speed should drop, the governor spindle 22 will move toward the left and the steam pressure behind the ball-valve member 17 will be sufficient to move the latter and the push rod 20 toward the left in order to supply an increased quantity of the steam to the passageway 15, the steam being readily supplied to the latter by means of the radiating steam ports 19 provided in the ball-valve seat member 18. In operation, the ball-valve member 17 is free to turn in all directions to present an infinite number of portions to contact with the seat member 18 and thus lessens the liability of the valve member to become steam cut as compared with the old type of valve having a single seating portion, thereby increasing the durability thereof and making the turbine a more reliable machine. As already pointed out, since the valve member is of the ball form, it may be cheaply produced with a high degree of accuracy and of any desired hard material.

From the foregoing, it will be seen that I have provided valve mechanism for prime movers, more particularly of the high-speed type, for example, locomotive headlight turbines, which is simple and durable and therefore tends to render the operation of apparatus of this character more reliable.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a prime mover, the combination of a ball valve for controlling the admission of motive fluid to the prime mover, said valve being moved in an opening direction by motive fluid pressure, speed-responsive means, a push rod for moving the valve in a closing direction, and a ball contact connection between the speed-responsive means and the push rod.

2. In combination with an elastic-fluid turbine, a governor having a spindle, an elastic-fluid ball admission valve moved in an opening direction by motive-fluid pressure, a push rod contacting with the valve member, and a ball contact connection between the governor spindle and the push rod.

3. In combination with an elastic-fluid turbine, a governor having a spindle, a push rod, a turbine member provided with a motive fluid supply passage and opposed openings communicating with the passage, a motive-fluid admission member having a portion fitting within one of the openings and provided with a valve seat, a ball valve cooperating with the seat, a push rod for moving the ball valve toward its seat, a bushing arranged within the opposed opening and affording a fluid tight joint with respect to the push rod, and a ball contact connection between the push rod and the governor spindle.

4. In combination with an elastic-fluid turbine, a governor carried thereby and provided with a spindle, and elastic-fluid admission valve including a ball member arranged approximately in line with the governor spindle, said valve being opened by fluid pressure thereagainst, a push rod adapted to contact with the ball member for the purpose of moving the latter to restrict the flow of elastic fluid, and a transmitting connection between the push rod and the governor spindle including a second loose ball member.

5. In a turbine, the combination of a steam inlet terminating in a valve seat arranged coaxially of the turbine, a ball valve member cooperating with the seat and tending to be unseated by the steam, a push rod arranged coaxially of the turbine for moving the ball valve member toward its seat, and governor mechanism including an operating element arranged coaxially of the turbine for moving the push rod and having a ball connection therewith.

In testimony whereof, I have hereunto subscribed my name this 25th day of August, 1921.

HUGH W. NEWBERG.